(12) United States Patent
Czebiniak (10) Patent No.: US 8,368,277 B2
(45) Date of Patent: Feb. 5, 2013

(54) DIE CAST ROTOR WITH STEEL END RINGS TO CONTAIN ALUMINUM

(75) Inventor: David Joseph Czebiniak, Newark Valley, NY (US)

(73) Assignee: BAE Systems Controls Inc., Johnson City, NY (US)

( * ) Notice: Subject to any disclaimer, the term of this patent is extended or adjusted under 35 U.S.C. 154(b) by 0 days.

(21) Appl. No.: 13/197,471

(22) Filed: Aug. 3, 2011

(65) Prior Publication Data

US 2011/0283525 A1   Nov. 24, 2011

Related U.S. Application Data

(62) Division of application No. 12/349,615, filed on Jan. 7, 2009.

(51) Int. Cl.
*H02K 17/00* (2006.01)
*H02K 1/00* (2006.01)
*H02K 1/06* (2006.01)
*B23P 19/04* (2006.01)

(52) U.S. Cl. .......... 310/211; 310/182; 310/216.004; 29/596; 29/598

(58) Field of Classification Search .......... 310/211, 310/182, 216.004; 29/596, 598
See application file for complete search history.

(56) References Cited

U.S. PATENT DOCUMENTS

| | | | |
|---|---|---|---|
| 2,877,408 A * | 3/1959 | Williams | 324/545 |
| 4,760,300 A * | 7/1988 | Yoshida et al. | 310/211 |
| 5,336,060 A * | 8/1994 | Tomell et al. | 417/410.5 |
| 7,339,303 B2 | 3/2008 | Mitcham | |
| 2003/0062786 A1 | 4/2003 | Reiter, Jr. et al. | |
| 2005/0040726 A1 | 2/2005 | Sato | |
| 2007/0075603 A1* | 4/2007 | Whiddon | 310/211 |

FOREIGN PATENT DOCUMENTS

| JP | 11041873 A * | 2/1999 |
|---|---|---|
| JP | 2003-61323 | 2/2003 |

OTHER PUBLICATIONS

Machine Translation JP11041873 (1999).*
U.S. Official Action dated Aug. 3, 2010 from related U.S. Appl. No. 12/349,615.
U.S. Official Action dated Jan. 24, 2011 from related U.S. Appl. No. 12/349,615.
U.S. Official Action dated May 3, 2011 from related U.S. Appl. No. 12/349,615.

* cited by examiner

*Primary Examiner* — Quyen Leung
*Assistant Examiner* — Jose Gonzalez Quinones
(74) *Attorney, Agent, or Firm* — Scully, Scott, Murphy & Presser, P.C.

(57) ABSTRACT

A rotor for an electrical inductor motor or an induction generator includes a core having spaces formed in the core. The rotor also has a first end ring. The first end ring has a first hub portion. A first ring is connected to the first hub portion by first spokes. The rotor also has a second end ring. The second end ring has a second hub portion. A second ring is connected to the second hub portion by second spokes. The first end ring is secured to the core. The second end ring is rotated a predetermined amount so the first spokes are misaligned with the second spokes. The second end ring is connected to the first end ring and the core. The core, the first end ring and the second end ring form a substrate. An aluminum conductor is cast to the substrate. The aluminum conductor fills in the spaces and around the first and second spokes to form a cast rotor.

11 Claims, 6 Drawing Sheets

DIE CAST ROTOR WITH STEEL END RINGS TO CONTAIN ALUMINUM

RELATED APPLICATION

This application is a divisional of U.S. Ser. No. 12/349,615, filed Jan. 7, 2009, the entire contents of which are incorporated herein by reference.

FIELD OF THE INVENTION

The present disclosure relates to a rotor for an induction generator or motor. More particularly, the present disclosure relates to a rotor that includes resilient end rings that permit a new method for the rotor to be die cast with an aluminum material.

DESCRIPTION OF THE RELATED ART

Electric rotors for motors and generators can rotate relative to a stator generally at speeds of up to 10,000 to 15,000 rpm. Generally, a retention mechanism is needed to keep the end ring connected to the body of the rotor. Sometimes, a band of a high strength material can be secured to each end ring of the rotor to secure it to the body. Rivets can also be cast into the rotor to secure the end rings to the body. Additionally, some solutions use special laminations to secure the body with the end rings. United States Published Patent Application No. 2005/0040726A1 to Sato discloses a rotor with end rings that have support holes. Grooves can be formed to engage with the support holes to secure the end plates during rotation of the rotor.

Generally, these solutions are effective in reducing the stress concentration profile at certain areas and are also effective in keeping the rotor together at a high speed. These solutions have limited applicability because while moderately effective, these solutions do not address thermal stresses experienced by the rotor parts in response to heat. These solutions also do not address the different expansion rates of these parts and how this relates to fatigue stresses that build up at the joint of the end ring and the rotor bar. Often during operation, the rotor is cycled from stationary to maximum rotational speed numerous of times per day. This will cause the rotor to heat up and cool down repeatedly over the course of the numerous cycles. Many times, various parts of the rotor can be formed from different materials. Often, a coefficient of thermal expansion is different between the materials that make up the rotor (such as, for example, the aluminum bars, end rings, and the steel laminations or other rotor parts). Aluminum may expand at a different rate than a steel portion of the rotor. Sometimes aluminum can expand at twice the rate that a steel material expands over the same temperature range. This can cause aluminum parts to undergo fatigue and develop cracks, which can lead to poor tolerances and eventually a possible failure of the rotor. Therefore, there is a need in the art for a rotor that can be used for a period of time at high speeds and be cycled without undergoing a premature failure of the rotor or part thereof.

SUMMARY OF THE INVENTION

An end ring that is continuous for a full 360 degrees experiences radial growth due to both thermal expansion and rotational speed related growth. Both of these feed into the hoop stress of the end ring and more importantly into the fatigue stress of the end ring to rotor bar interface. An electric machine consists of many rotor bars that are enclosed by the steel laminations; these bars extend thru the laminations and connect to the machine end rings on each side the rotor. These end rings expand in the radial direction as mentioned above. However, the rotor bars do not experience the same amount of radial growth as the end rings because they are enclosed by the steel laminations. The result is an end ring that expands and contracts in the radial direction at a much higher rate than the rotor bars causing a fatigue stress at the joint of the end ring to rotor bar interface. The fatigue stress at this joint will introduce a crack and over time ultimately fail the machine. This disclosure helps the rotor in two distinct ways. First, by breaking the end ring into sections it limits the thermal growth to each section thus reducing the thermal growth of the entire the ring. Second, the geometry of the spoked end ring helps contain the end ring at high speed by acting like a band as used in rotors today. These improvements reduce the amount of radial growth of the end ring and reduce the fatigue stress at the joint location and hoop stress in the end rings. A minimum of two end rings are required per side of the rotor, this is due to the fact that the end ring still needs to connect all of the rotor bars together for the machine to work. By rotating the first end ring relative to the second end ring the resulting cast material will connect all the rotor bars while still providing the benefit of reduced stresses.

According to a first aspect of the present disclosure, there is provided an electric machine including a stator and rotor. The rotor includes a core including a plurality of spaces formed in the core. The rotor also has a first and second end ring on each side of the rotor. The first end ring has a first hub portion connected to a first ring by a plurality of first spokes. The second end ring also has a second hub portion connected to a second ring by a plurality of second spokes. In this embodiment, the first end ring is secured to the core. The second end ring is rotated a predetermined amount so the plurality of first spokes are misaligned with the plurality of second spokes. The second end ring is connected to the first end ring and the core. The first end ring, the second end ring and the core form the substrate. The conductor extends around the plurality of first and second spokes to form the rotor.

According to another aspect of the present disclosure, there is provided a method of manufacturing a rotor. The method includes forming a core. The core has a plurality of spaces formed therein. A first end plate is connected to an end of the core. The first end plate includes a first hub connected to a first ring by a plurality of first spokes. The method also includes connecting a second end plate to the first end plate. The second end plate includes a second hub. The second hub is connected to a second ring by a plurality of second spokes. The end plates and the core form a substrate. The second spokes are staggered from the first spokes to form pockets. The pockets are defined as being between the first and second spokes. An aluminum material is cast to the substrate with the aluminum flowing into the spaces of the core and into the pockets to form a cast rotor.

In yet another aspect of the present disclosure, there is provided an end ring for an induction die cast rotor. The end ring has a first member that includes a first ring connected to a first hub by a plurality of first spokes. The end ring also has a second member connected to the first member. The second member includes a second ring connected to a second hub by a plurality of second spokes. The first spokes are offset from the second spokes by a predetermined amount. The first and second spokes form pockets. A different material relative to the first member and the second member extends into the pockets. The first member and the second member reduce a hoop stress caused by thermal fatigue of the rotor that is attributed to the material during cyclic operation of the rotor.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

The present disclosure is directed to an electric machine 100 such as an induction motor or generator having a rotor 10 and a stator 11. In the illustrated embodiment, the rotor 10 is advantageously cast from pure aluminum, which encompasses a first and a second end ring 12, 14 made preferably from steel or a steel alloy. It should be appreciated that the present disclosure is not limited to these specific materials, and other suitable materials can be used to form the rotor 10. The steel end rings 12, 14 preferably are adapted to contain the aluminum at high speeds of rotation by breaking up the end rings 12, 14 into one or more pockets 16, 16a to reduce hoop stresses caused by thermal fatigue. It should be appreciated that casting with pure aluminum using the steel end rings 12, 14 preferably provides several benefits. First, suitable mechanical strength is provided by the end rings 12, 14, while the aluminum provides suitable casting, thermal, and electrical properties. This combination allows high-speed rotor operation that can withstand many thermal cycles. Typically, by joining two rotors parts using rivets or the like, these benefits could not be accomplished.

Hoop stress is mechanical stress defined for rotationally-symmetric objects that result from forces acting circumferentially (perpendicular both to the axis and to the radius of the object). Along with axial and radial stress, it is a component of the stress tensor in cylindrical coordinates. The classic example of hoop stress is the tension applied to the iron bands, or hoops, of a wooden barrel. For example, for illustration purposes, in a straight, closed pipe, any force applied to the cylindrical pipe wall by a pressure differential will ultimately give rise to hoop stresses.

Generally, rotor 10 includes a composite like structure where a first portion includes a first material and a second portion includes a second material to form a structure that reduces hoop stress on rotor 10. Rotor 10 includes end caps, plates, or ring sets 12, 14 on each end of the rotor 10 that are intended to diminish the hoop stress using a relatively large amount of steel or a material that is suitable for thermal expansion while using a lesser amount of aluminim or a materal that is not suitable for thermal expansion on the end cap ring sets 12, 14. At the same time, a remainder of the rotor 10 is permited to be cast from alumimum to take advantage of aluminum's attractive electrical conductivity, thermal and casting properties.

Figure 1:
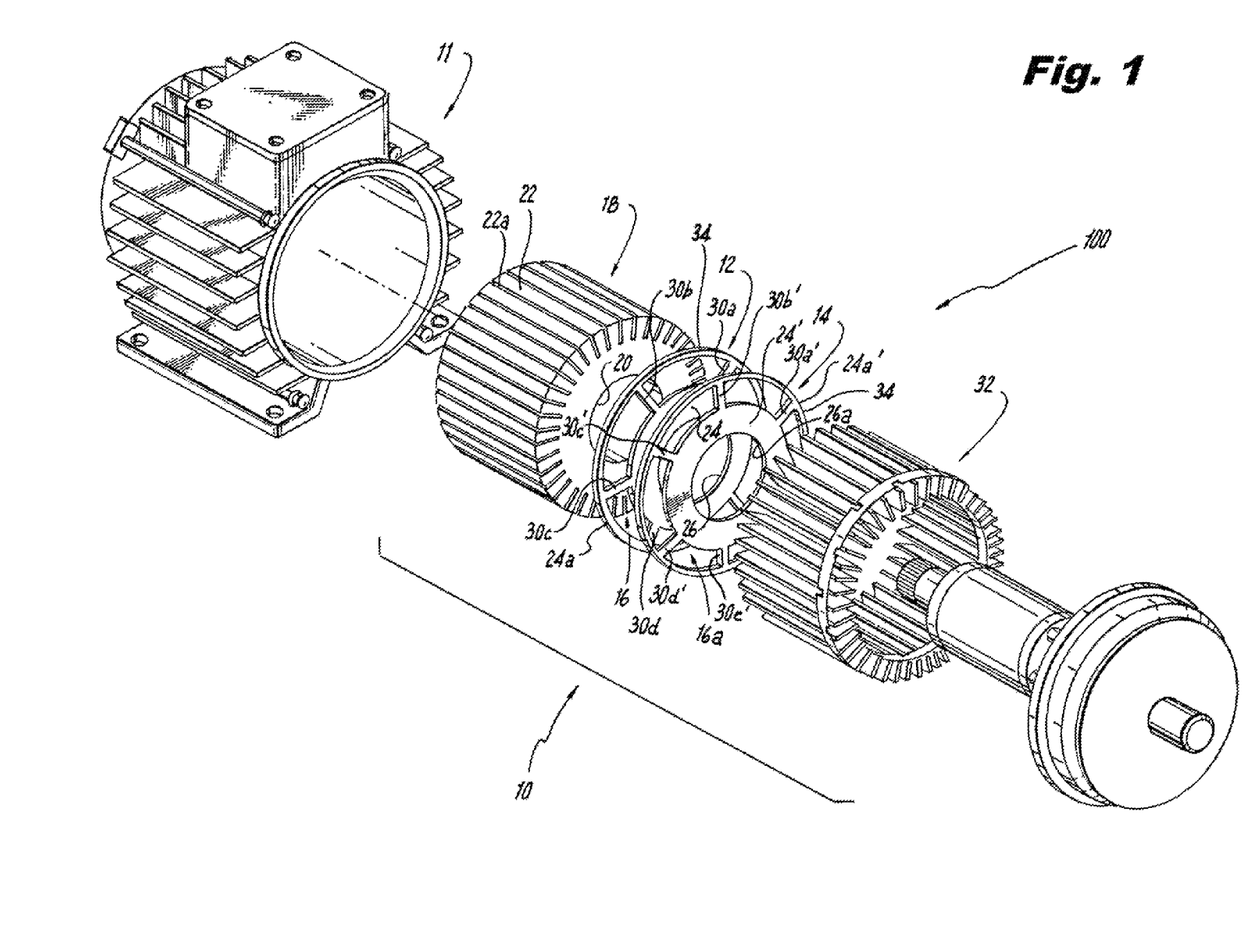
FIG. 1 shows an electric machine of the present disclosure in an exploded view with the rotor having a core material, a first end ring and a second end ring with die cast aluminum.

Turning again now to FIG. 1, there is shown rotor 10 according to the present disclosure. Rotor 10 is preferably rotationally mounted relative to a stator 11 to form an electric machine, like an inductor motor or a generator. In one embodiment, the stator 11 produces a rotating magnetic field when powered by an electrical source and this enables the rotor 10 to rotate by the electromagnetic flux and create mechanical torque. Alternatively, when operated as a generator, the rotor 10 can be made to rotate by mechanical power, which in turn, would cause electrical power to be induced in the stator. The present rotor 10 is applicable to either configuration. In the exemplary embodiment, rotor 10 includes a core material 18. The core material 18 includes an aperture 20 where a rotor shaft will extend through the aperture 20. In the illustrated embodiment, the core material 18 includes a number of disk like sheets 22 that form a generally annular configuration when assembled. As shown in FIG. 1, the core material 18 is formed by stacking a plurality of the disk like sheets 22 parallel to a longitudinal axis extending through the rotor 10 which define a plurality of spaces 22a therebetween to form the core material 18 having the plurality of spaces 22a therein. Each of the sheets 22 extend radially and parallel to the longitudinal axis of the rotor 10.

Various configurations of core material 18 are possible and within the scope of the present disclosure. In one non-limiting embodiment, core material 18 is formed from silicon steel laminations 22 made fifteen thousands of an inch thick and formed in a generally annular configuration. By way of example, when assembled, rotor 10 is about ten inches in diameter and is about ten inches in length, however it should be understood that the present rotor 10 can have sizes suitable for any type of electrical generator or electrical induction motor, or can be formed as a portion of a gas turbine or turbo charger that generates electrical energy for a combustion engine. Various configurations are possible and these shown dimensions are merely illustrative of one embodiment of the present disclosure. It should be appreciated that between each of the sheets 22 are a number of spaces 22a, which will receive a conductive material 32 during die casting. In the exemplary embodiment, a molten material 32 can flow into spaces 22a under high pressure. It should be appreciated that normal casting can also be used and is within the scope of the present disclosure, and less preferably, rotor 10 or parts thereof can be extruded.

FIG. 1 shows a first embodiment of an exploded view of rotor 10. The first end ring 12 includes a first hub portion 24 that defines a first opening 26 to allow a rotor shaft (FIG. 1) to pass therethrough, and which communicates with aperture 20 of core material 18. The first hub portion 24 of the first end ring 12 is preferably connected by a number of first spokes 30a, 30b, 30c, 30d, 30e, and 30f to an outer ring member 24a. It should be appreciated that any number of first spokes 30a, 30b, 30c, 30d, 30e, 30f can be used with the present disclosure, and this number can vary depending on the size of the first hub portion 24 and rotor 10 itself. Notably, a number of pockets or spaces 16 are formed between each of the first spokes 30a, 30b, 30c, 30d, 30e, and 30f. Pockets 16 will also receive a conductive material during casting. Although six spokes 30a-30f are shown, it should be appreciated that the rotor 10 may have three spokes, eight spokes, twelve spokes, or any number of spokes in the art.

Spaced from first end ring 12 is second end ring 14. Although both are described as end rings 12, 14 it should be appreciated the term ring forms no limitations to the present disclosure and that end rings 12 and 14 may include various geometries and are not limited to the specific shape being shown and may have different shapes. In the illustrated embodiment, second end ring 14 also includes a second hub portion 24' that defines an aperture 26a to allow a rotor shaft (FIG. 1) to pass therethrough, which communicates with apertures 20 and 26. Similarly, the second hub portion 24' of the second end ring 14 is connected by a number of second spokes 30a', 30b', 30c', 30d', 30e', 30f' to a second outer ring member 24a'. It should be appreciated that any number of second spokes 30a', 30b', 30c', 30d', 30e', 30f' can be used with the present disclosure, and this spoke number can vary depending on the size of the second hub portion 24' and ring 24a'. Notably, a number of spaces 16a are formed between each of the second spokes 30a', 30b', 30c', 30d', 30e' and 30f'. Spaces 16a preferably will also receive a conductive material 32 during casting.

In the shown embodiment, core 18, first and the second end rings 12, and 14 form a substrate member that is die cast with aluminum conductor material shown in an exploded view as reference numeral 32. In operation, core material 18, the first and the second end rings 12, and 14 are all connected to one another. In the example shown, core material 18, the first end ring 12, and the second end ring 14 form a sandwich configuration with core 18 and second end ring 14 sandwiching first end ring 12. All are clamped together and placed in a die cast mold (not shown). It should be appreciated that the cast mold can be any suitable mold for die casting that is connected to a pressure source, and may includes clamps for securing and holding the substrate together.

Preferably, the thickness of first end ring 12 and second end ring 14 can depend on the specific application. In one embodiment, first end ring 12 and second end ring 14 are stamped and each ring 12, 14 can be up to ⅛ inch thick. In an alternative embodiment, first end ring 12 and second end ring 14 can be machined to a desired thickness and can be up to 0.375 inches inch thick each. The combined resulting first and second end rings 12, 14 are 0.750 inches thick with respective pockets 16, 16a, where the first and second spokes 30a, 30a' are each machined down to about 0.375 inches thick. The total thickness of end rings 12 and 14 are dependent on machine design and are not limited to 0.750 inches thick and can have various thickness values.

It should be appreciated that before second ring 14 is connected to first ring 12, second ring 14 is rotated a predetermined amount relative to first end ring 12 so the plurality of first spokes 30a, 30b, 30c, 30d, 30e, 30f are staggered by a predetermined radial amount relative to the plurality of second spokes 30a', 30b', 30c', 30d', 30e', and 30f'. It should be appreciated that first spokes 30a, 30b, 30c, 30d, 30e, 30f are staggered relative to the plurality of second spokes 30a', 30b', 30c', 30d', 30e', 30f' by any predetermined radial amount desired by the user so that the proper magnetic flux is dispersed in a radial manner during rotation of rotor 10. In one embodiment, spokes 30a, and 30a' can be staggered by about thirty degrees or more. Various staggering configurations and radial offsets between the spokes 30a-30f and 30a'-30f' are possible and within the scope of the present disclosure. In one preferred embodiment, six spokes 30a-30f and 30a'-30f' are envisioned for first and second end rings 12, 14. It should be appreciated that a rotor shaft geometry may drive the spoke's 30a-30f and 30a'-30f' geometry and length as the spokes cannot impede the rotor shaft that fits through apertures 20, 26 and 26a.

In the exemplary embodiment, the aluminum conductor member 32 is die cast to fill the spaces 16 formed in the first end ring 12 and to fill spaces 16a in the second end ring 14 and the spaces 22a between the laminations 22 of the core material 18. Cast material is not filled in the top periphery 34 of the first and the second end rings 12, 14, or the aperture 20, 26, and 26a where the rotor shaft engages the completed rotor 10. In the illustrated embodiment, the aluminum conductor material 32 is heated to a melting point and then injected into the mold under high pressure of about 10 to about 210 Mpa (1,450 psi-30,500 psi). This results in a uniform rotor 10, generally good surface finish to the outer top periphery 34 and good dimensional accuracy, as good as about 0.2% of casting dimension. In one embodiment sufficient pressures and a die can be used so a post-machining step to remove filings can be totally eliminated, or very light machining may be required to bring dimensions to size.

Die casting of the aluminum conductor 32 can be done using a cold chamber or hot chamber process. In a cold chamber process, the molten aluminum conductor 32 is ladled into the cold die chamber for each aluminum shot. This cold chamber process is particularly useful for metals such as aluminum, and copper (and its alloys) that alloy easily with iron at the higher temperatures. The hot chamber process is used for metals of low melting point and high fluidity such as tin, zinc, and lead that tend not to alloy easily with steel at their melt temperatures. It should be appreciated that the present rotor 10 is not limited to steel and aluminum and other materials can be used to manufacture rotor 10. Additionally, once die cast, rotor 10 is tested and extraneous material, if any, is removed, and the rotor 10 is balanced.

Figure 2:
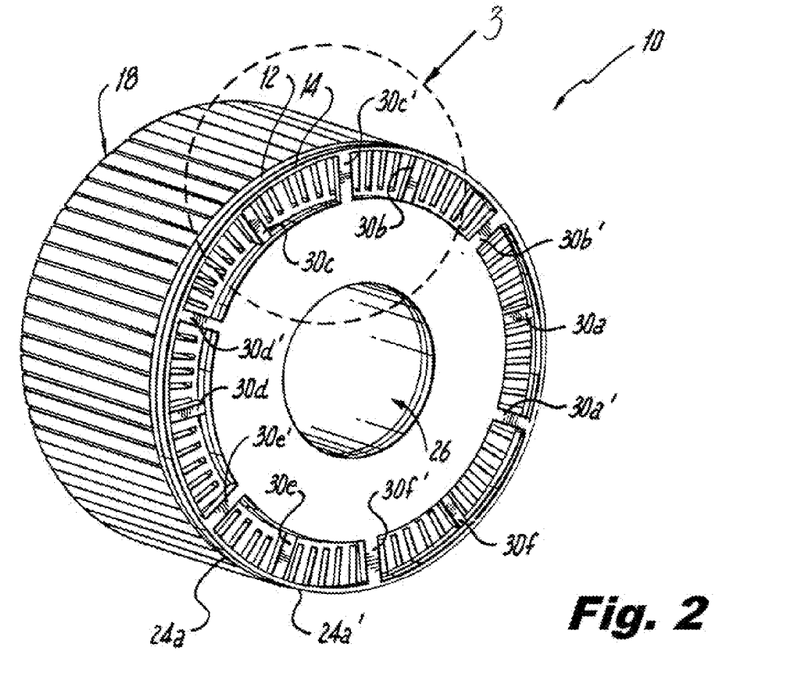
FIG. 2 shows a perspective view of a core combined with a first and a second end ring with the three elements forming a substrate prior to be die cast with the aluminum conductor of FIG. 1.
Figure 3:
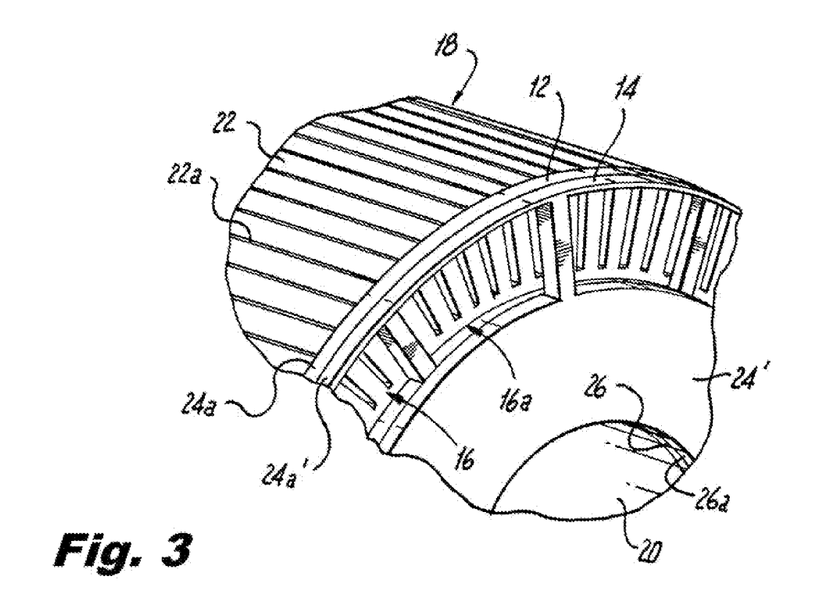
FIG. 3 shows an enlarged view of FIG. 2 of the first and the second end rings with the spokes in a staggered configuration.

Turning now to FIGS. 2 and 3, there is shown an assembled view of the first end ring 12 and the second end ring 14 being connected to an end of core material 18 prior to being die cast with the conductive material 32. As shown, first spoke 30a is staggered a predetermined amount from the second spoke 30a' of second end ring 14. Likewise, the second spoke 30b is staggered the predetermined amount from the second spoke 30b' of end ring 14. As stated previously, this predetermined amount can vary. It should be appreciated that the spacing with corresponding spokes (such as between the first and the second spoke 30a, 30b and 30a' and 30b' of the first and the second end rings 14, 16) may also vary and the offset between spokes 30a and 30a' and between spokes 30b and 30b' may be different from one another and do not need to be the same amount. In operation, there is shown the spaces 22a formed in the stack 22 which communicate with the pockets 16 and 16a formed within the respective first and the second spokes 30a-30f and 30a'-30f'. In the exemplary embodiment, the molten aluminum conductor 32 flows between the pockets 16, 16a and spaces 22 to fill the pockets 16 and 16a and spaces 22. Additionally, a third and a fourth end plate (not shown) are connected to an opposite end of the core material 18 in a similar manner.

Figure 4:
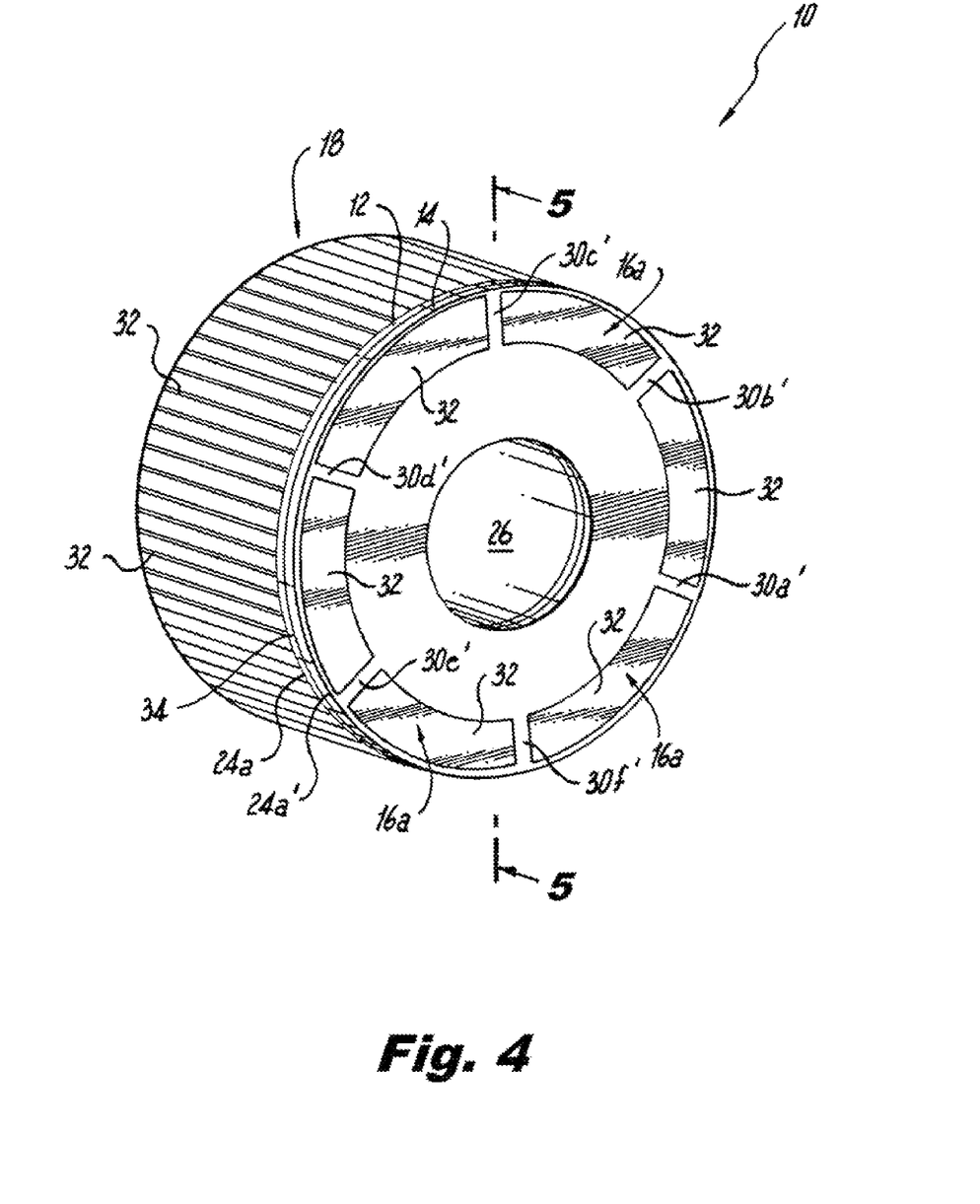
FIG. 4 shows a perspective view of the rotor after being die cast with the aluminum covering the core material and filling in the pockets between the spokes.
Figure 5:
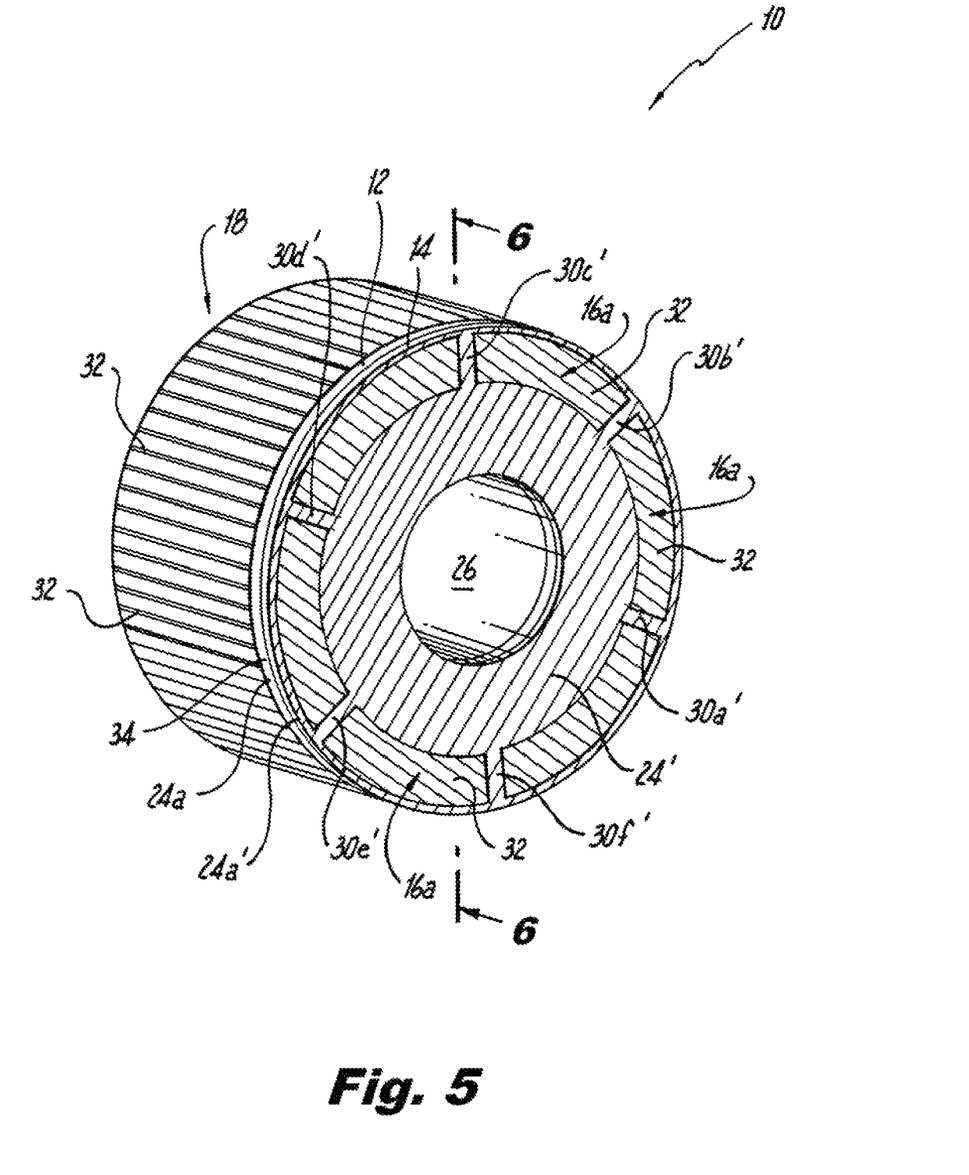
FIG. 5 shows a cross sectional view of the rotor through the second end ring.

Turning now to FIGS. 4 and 5, there is shown the rotor 10 after being die cast with aluminum 32 showing a view through the second end ring 14. As can be appreciated with FIG. 4, the outer periphery 34 of the end rings 12, and 14 is substantially flush with an outer surface of the aluminum conductor 32 over core material 18. Additionally, as shown the aluminum 32 fills the pockets 16a and 16 and spaces 22 while leaving the central aperture 20, 26, and 26a unfilled and open for a rotor shaft (FIG. 1) to extend therethrough. FIG. 5 shows a cross sectional view of the rotor 10 showing pockets 16a filled with the aluminum conductor 32. Reviewing FIG. 5 together with FIG. 6, one can appreciate that the spokes 30a', 30b', 30c', 30d', 30e' and 30f' of the second end ring 14 are staggered relative to the spokes 30a, 30b, 30c, 30d, 30e and 30f of the first end ring 12 by about thirty degrees.

Figure 6:
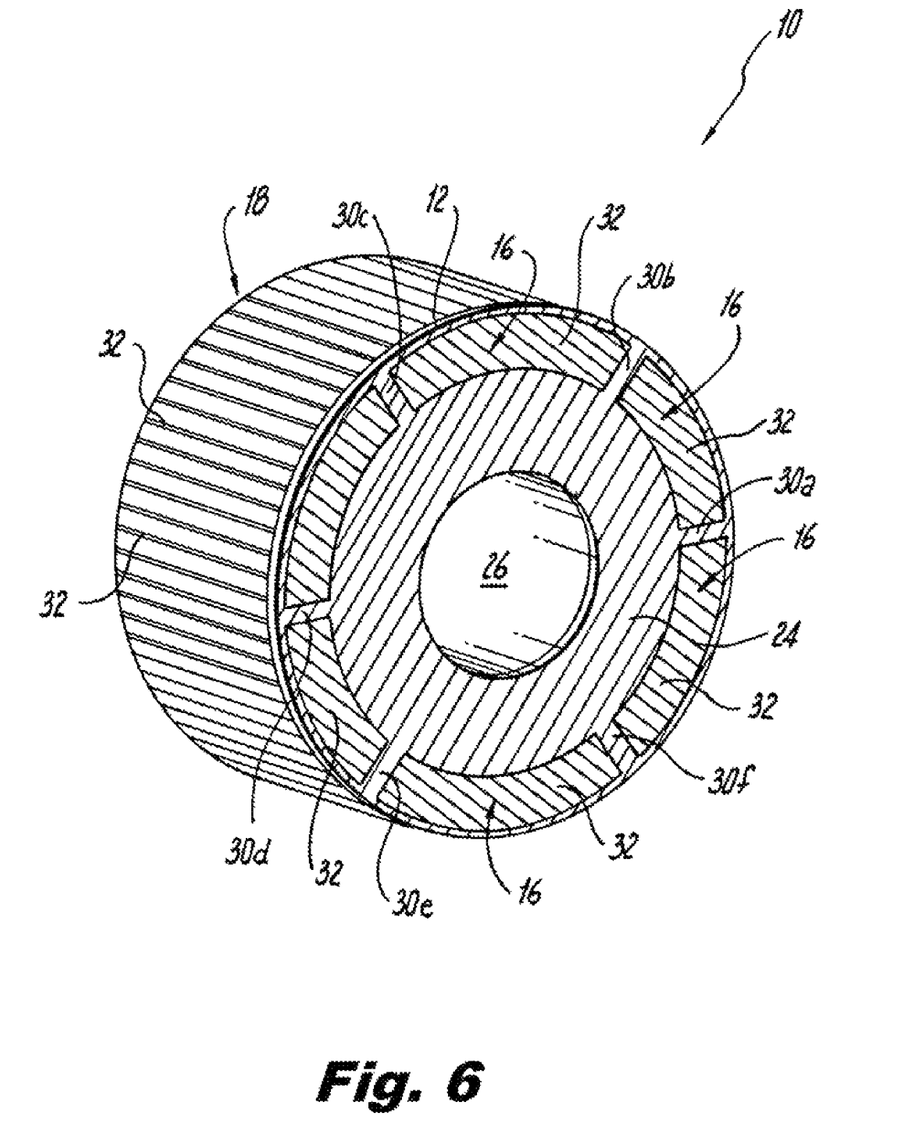
FIG. 6 shows another cross sectional view of the rotor through the first end ring.
Figure 7:
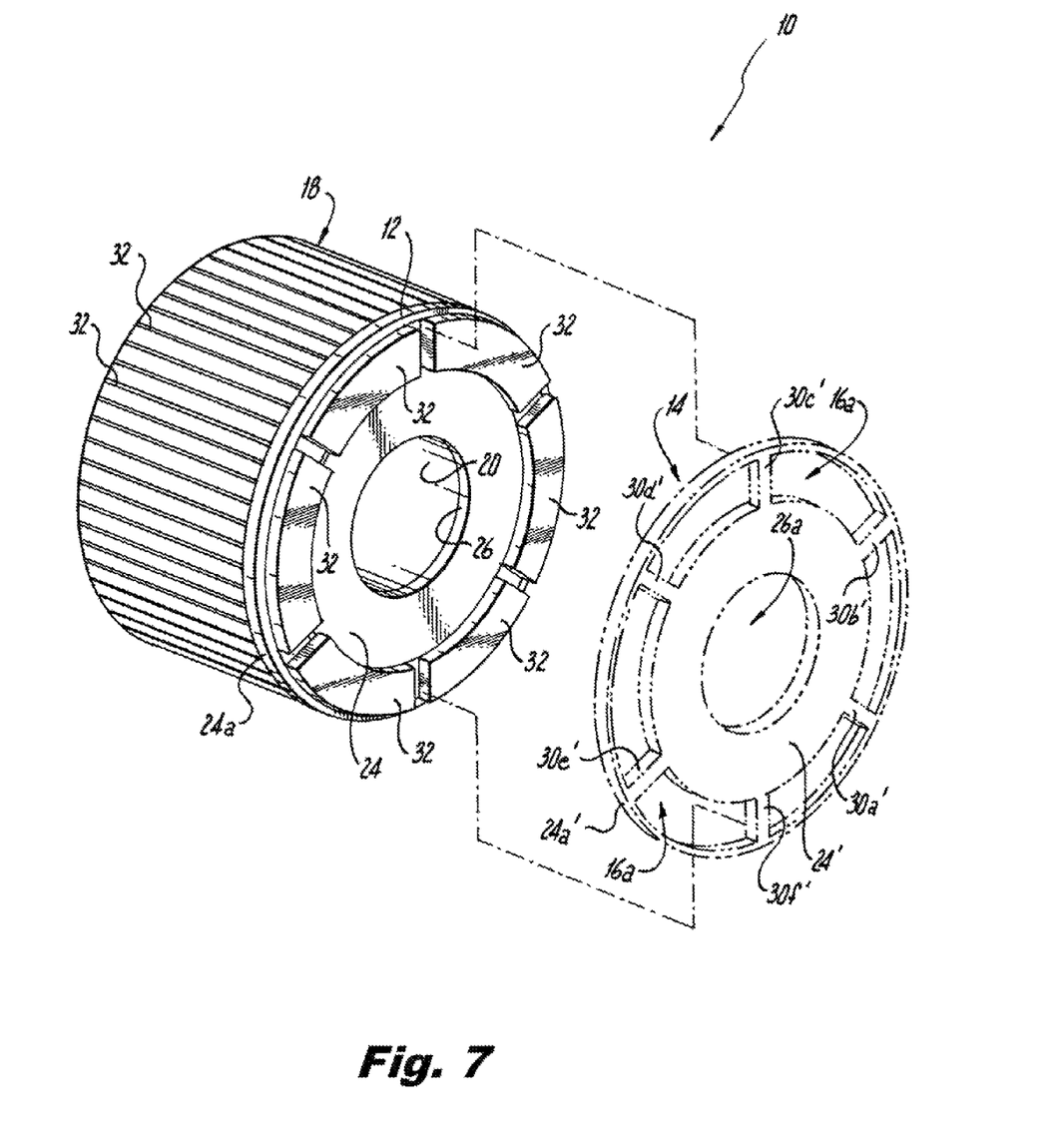
FIG. 7 shows yet another cross sectional view of the rotor through the first end ring and the core material and showing the second end ring spaced from the rotor for illustration purposes.

Turning now to FIG. 6 and FIG. 7, there is shown a circular cross sectional view along the first end ring 12 and a cross sectional view along the completed rotor 10 in FIG. 7. The aluminum 32 fills the pockets 16 and 16a and spaces 22 while leaving the central aperture 26 open for a rotor axis to be supported therethrough. FIG. 7 shows the spaces 22a between the laminations 22 of the core material 18 being filled.

In the illustrated embodiment, the first and the second end rings 12 and 14 are formed from a non ferrous steel material or suitable steel alloy. In one embodiment, the first and the second end rings 12 and 14 can be stamped and then connected to the core material 18 of FIG. 1. However, in another alternative embodiment, the first and the second end rings 12 and 14 can be made from a laminated material stacked to obtain the machines desired end ring length. The first and the second end rings 12 and 14 can be made from a ferrous material only if a non-ferrous layer or material separates it from the core material 18. The non-ferrous material is adapted to separate the aluminum conductor material 32 from the core material 18 so as to not affect the magnetic flux of the rotor 10 during operation. The completed cast rotor 10 includes two end plates or end rings 12, 14 on each side of the core 18.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, reference to details of the various embodiment are not intended to limit the scope of the claims which in themselves recite only those features regarded as essential to the invention.

What is claimed is:

1. A method of manufacturing a rotor comprising:
   stacking a plurality of sheets positioned parallel to a longitudinal axis extending through the rotor, the plurality of sheets defining a plurality of spaces therebetween to form a core having the plurality of spaces therein, wherein each of the sheets extend radially and parallel to the longitudinal axis;
   connecting a first end plate to an end of the core, the first end plate including a first hub connected to a first ring by a plurality of first spokes;
   connecting a second end plate to the first end plate, the second end plate including a second hub connected to a second ring by a plurality of second spokes;
   forming a substrate from the end plates and the core;
   staggering the plurality of second spokes from the plurality of first spokes to form pockets being defined between the plurality of first and second spokes; and
   casting a conductor to the substrate with the conductor flowing into the plurality of spaces of the core and the pockets to form a cast rotor.

2. The method of claim 1, further comprising providing a stator, wherein the rotor is rotatably mounted in the stator to form an electric machine.

3. The method of claim 1, wherein at least one of the first and the second end rings is comprised of steel.

4. The method of claim 1, wherein the conductor is comprised of aluminum.

5. The method of claim 1, wherein the first end ring is comprised of nonferrous material, and the second end ring is comprised of ferrous material, and wherein the first and the second end rings form a laminate.

6. The method of claim 5, wherein the laminated end ring has a varying thickness.

7. The method of claim 1, wherein at least one of the first and the second end rings is formed by a stamping operation.

8. The method of claim 1, wherein the first end ring is disposed between the second end ring and the core, and the first end ring is comprised of a material that forms a buffer between the second end ring and the core.

9. The method of claim 1, further comprising:
   heating the conductor to a molten state; and
   flowing the molten conductor under high pressure into the plurality of spaces.

10. The method of claim 1, wherein each of the sheets extend longitudinally along the longitudinal axis substantially a length of the core.

11. The method of claim 10, wherein the conductor includes a plurality of longitudinally extending material configured to substantially mate with the plurality of spaces defined by the plurality of sheets.

* * * * *